(12) United States Patent
Leijdekkers et al.

(10) Patent No.: US 9,505,422 B2
(45) Date of Patent: Nov. 29, 2016

(54) DOLLY

(71) Applicants: Gertjan Leijdekkers, The Hague (NL); Nico Jungschlager, Voorburg (NL); Edwin Alewijnse, Nootdorp (NL)

(72) Inventors: Gertjan Leijdekkers, The Hague (NL); Nico Jungschlager, Voorburg (NL); Edwin Alewijnse, Nootdorp (NL)

(73) Assignee: GERTJAN LEIJDEKKERS, The Hague (NL)

( * ) Notice: Subject to any disclaimer, the term of this patent is extended or adjusted under 35 U.S.C. 154(b) by 0 days.

(21) Appl. No.: 14/429,460

(22) PCT Filed: Sep. 23, 2013

(86) PCT No.: PCT/NL2013/050682
§ 371 (c)(1),
(2) Date: Mar. 19, 2015

(87) PCT Pub. No.: WO2014/046546
PCT Pub. Date: Mar. 27, 2014

(65) Prior Publication Data
US 2015/0217791 A1  Aug. 6, 2015

(30) Foreign Application Priority Data

Sep. 21, 2012 (NL) .................................... 2009500
Apr. 17, 2013 (NL) .................................... 2010651

(51) Int. Cl.
*B62B 5/04* (2006.01)
*B62B 3/00* (2006.01)
*B62B 5/00* (2006.01)

(52) U.S. Cl.
CPC ............. *B62B 5/0485* (2013.01); *B62B 3/00* (2013.01); *B62B 5/0433* (2013.01); *B62B 5/0093* (2013.01); *B62B 2301/0467* (2013.01); *B62B 2301/04632* (2013.01)

(58) Field of Classification Search
CPC . B62B 5/0485; B62B 5/0433; B62B 5/0093; B62B 3/00; B62B 2301/046; B62B 2301/0463; B62B 2301/04632; B62B 2301/0465; B62B 2301/0467
USPC ............................................. 280/79.11–79.7
See application file for complete search history.

(56) References Cited

U.S. PATENT DOCUMENTS 3,247,931 A    4/1966 Bunn
3,911,525 A *  10/1975 Haussels ............... B60B 33/021
                                                    16/35 D (Continued)

FOREIGN PATENT DOCUMENTS

DE         2216101       4/1972
DE    102009010923 A1    6/2010
(Continued)

OTHER PUBLICATIONS

International Search Report, dated Jan. 3, 2014, from corresponding PCT application.

*Primary Examiner* — Hau Phan
*Assistant Examiner* — Jacob Meyer
(74) *Attorney, Agent, or Firm* — Young & Thompson

(57) ABSTRACT

Disclosed is a dolly for transporting or presenting goods, including a braking member (8) that includes a flexible body, that is positioned near a tread of a wheel (6, 7) and that is fixedly connected with a first body part with a bottom part (3) or a suspension system of the wheel (6, 7) and with a second body part is connected to an end of an activation member (15), wherein, upon movement of an operating member (9) arranged on the dolly to a braking position, the second body part is bent towards the tread of the concerned wheel (6, 7) by the activation member (15) for engagement of the flexible body on the tread.

20 Claims, 2 Drawing Sheets

(56) References Cited

U.S. PATENT DOCUMENTS

Figure 1:
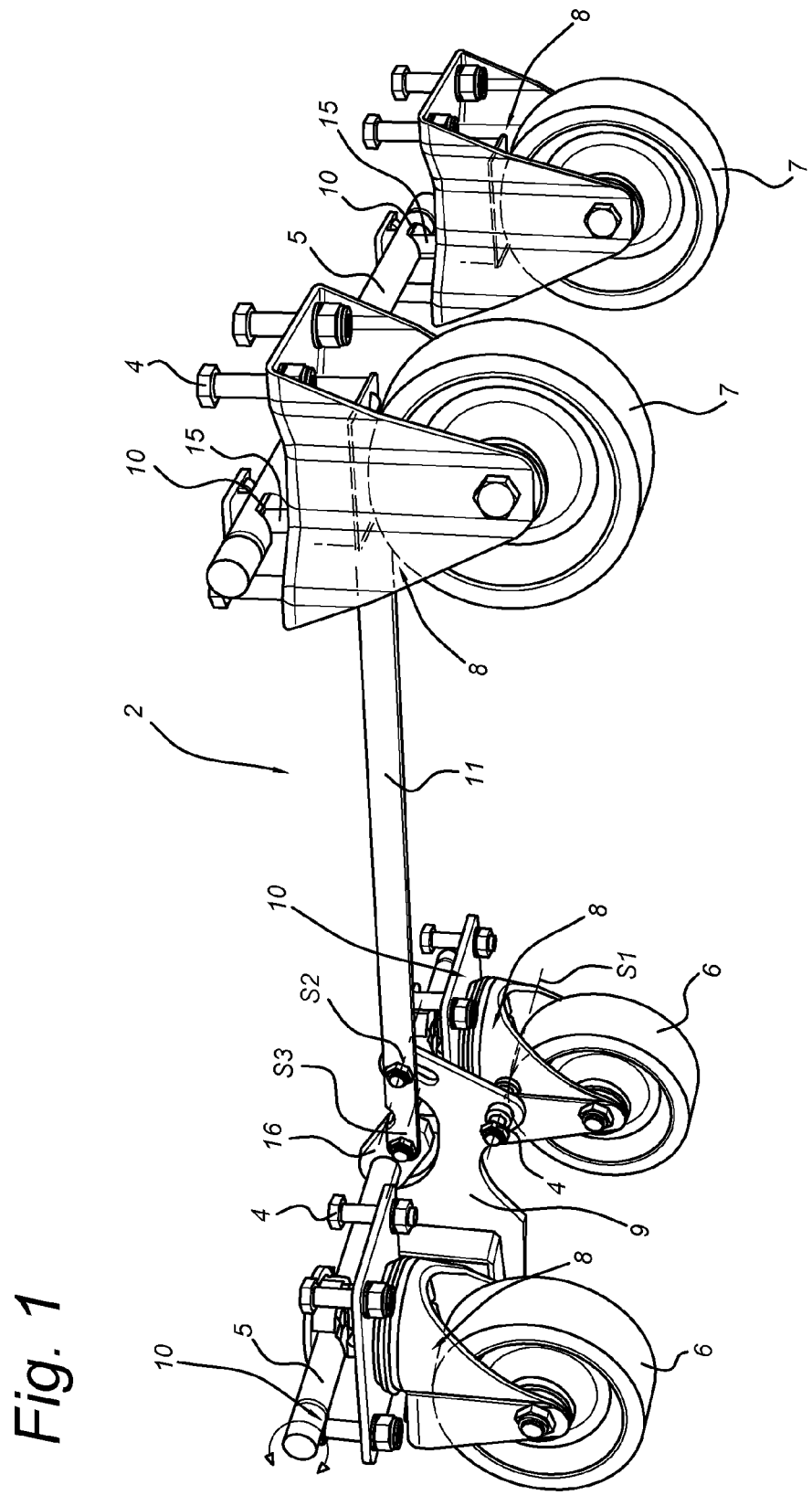

| | | | |
|---|---|---|---|
| 4,073,369 A | 2/1978 | Nordskog | |
| 4,205,413 A * | 6/1980 | Collignon | B60B 33/021 16/35 D |
| 4,349,937 A * | 9/1982 | Fontana | B60B 33/0078 16/35 R |
| 4,385,414 A * | 5/1983 | Damico | B60B 33/021 16/35 R |
| 4,460,189 A * | 7/1984 | Goff | B62B 1/12 280/47.27 |
| 4,722,114 A * | 2/1988 | Neumann | B60B 33/021 16/35 R |
| 5,115,539 A * | 5/1992 | Lee | B60B 33/021 16/35 R |
| 5,236,066 A * | 8/1993 | O'Neal | B60B 33/0078 16/35 R |
| 5,303,450 A * | 4/1994 | Lange | B60B 33/021 16/35 D |
| 5,377,372 A * | 1/1995 | Rudolf | A61G 7/00 16/35 R |
| 5,390,942 A * | 2/1995 | Schuster | B62B 5/04 280/19 |
| 5,531,295 A * | 7/1996 | Kopman | B60T 1/04 188/17 |
| 6,109,625 A * | 8/2000 | Hewitt | B60B 33/0007 280/43.24 |
| 6,212,733 B1 * | 4/2001 | Yeh | B60B 33/0002 16/35 R |
| 6,843,349 B2 * | 1/2005 | Walsh | B60B 33/0018 16/35 R |
| 6,871,380 B2 * | 3/2005 | Chen | B60B 1/006 16/19 |
| 7,021,651 B2 * | 4/2006 | Lan | B60B 33/026 280/47.371 |
| 7,546,908 B2 * | 6/2009 | Chang | A45C 5/145 16/35 R |
| 7,922,183 B2 * | 4/2011 | Figel | A61G 1/0237 280/47.38 |
| 7,926,145 B2 * | 4/2011 | Liao | B60B 33/0018 16/18 R |
| 8,079,606 B2 * | 12/2011 | Dull | B60B 33/0005 16/35 R |
| 8,205,297 B2 * | 6/2012 | Fallshaw | B60B 33/0021 16/35 R |
| 8,424,158 B2 * | 4/2013 | Steenson | B60B 33/0018 16/35 R |
| 8,452,508 B2 * | 5/2013 | Frolik | A61G 7/018 180/19.1 |
| 8,640,832 B2 * | 2/2014 | Chen | A61G 7/018 16/18 R |
| 8,726,462 B2 * | 5/2014 | Dayt | B60B 33/0028 16/35 R |
| 8,789,662 B2 * | 7/2014 | Childs | A61G 1/0243 16/35 R |
| 8,904,598 B2 * | 12/2014 | Waitz | A45C 5/14 16/20 |
| 8,910,953 B2 * | 12/2014 | Faulhaber | B62B 5/04 16/35 R |
| 9,168,785 B2 * | 10/2015 | Spektor | B60B 33/0076 |
| 2004/0112686 A1 * | 6/2004 | Hewitt | B62B 5/04 188/19 |
| 2004/0226134 A1 * | 11/2004 | Chen | B60B 1/006 16/35 R |
| 2006/0197296 A1 * | 9/2006 | Rice | B62B 3/14 280/33.994 |
| 2007/0013168 A1 * | 1/2007 | Li | B60B 33/025 280/642 |
| 2007/0056141 A1 * | 3/2007 | Armano | B60B 33/0021 16/35 R |
| 2007/0119661 A1 * | 5/2007 | Chang | A45C 5/145 188/1.12 |
| 2008/0111329 A1 * | 5/2008 | Brown | B60D 1/00 280/33.997 |
| 2009/0206565 A1 * | 8/2009 | Dull | B60B 33/0005 280/29 |
| 2009/0276977 A1 * | 11/2009 | Liao | B60B 33/0018 16/35 R |
| 2010/0132159 A1 * | 6/2010 | Armano | B60B 33/0021 16/35 R |
| 2011/0101636 A1 | 5/2011 | Faulhaber | |
| 2011/0120815 A1 * | 5/2011 | Frolik | A61G 7/018 188/1.12 |
| 2012/0085595 A1 * | 4/2012 | Chen | A61G 7/018 188/1.12 |
| 2013/0069325 A1 * | 3/2013 | Wallace | B60B 33/0002 280/47.34 |
| 2013/0174377 A1 * | 7/2013 | Lin | B60B 33/0081 16/35 R |
| 2013/0212834 A1 * | 8/2013 | Chen | B60B 33/0018 16/45 |
| 2014/0083803 A1 * | 3/2014 | Chen | A61G 7/018 188/1.12 |
| 2014/0238784 A1 * | 8/2014 | Yeo | B60B 33/025 188/1.12 |
| 2015/0210114 A1 * | 7/2015 | Spektor | B60B 33/0076 16/35 R |
| 2016/0009132 A1 * | 1/2016 | Spektor | B60B 33/0076 280/79.11 |

FOREIGN PATENT DOCUMENTS

| | | |
|---|---|---|
| EP | 0618088 A2 | 10/1994 |
| FR | 2200123 A1 | 4/1974 |
| GB | 2482570 A | 2/2012 |
| WO | 9906260 A1 | 2/1999 |

\* cited by examiner

DOLLY

The present invention relates to a dolly for transporting or presenting goods, comprising:
an undercarriage with a bottom part extending substantially horizontally during use that during use at an upper side thereof can be provided with a superstructure for comprising the goods to be transported or presented,
one or more wheels arranged at an underside of the undercarriage, wherein the wheels each comprise a tread and are rollably suspended in a suspension system that is attached to the lower side of the bottom part,
an operating member arranged on the undercarriage, wherein the dolly can be brought from an unbraked condition, for moving the dolly, to a braked condition, for parking the dolly, by operating the operating member,
a braking member, arranged below the bottom part near at least one of the wheels, which braking member is mechanically coupled to the operating member, wherein the braked condition can be achieved by moving the braking member by means of an activation member attached thereto in the direction of the tread of the concerned wheel, by moving the operating member to a braking position, and the unbraked position can be achieved by moving the braking member away from the concerned wheel by means of the activation member, by moving the operating member to a release position.

Such dolly's are known. The international patent publication WO 99/06260 for example describes a dolly with a braking member with an activation member, that can be moved towards a wheel by operating the operating member, for engagement thereon.

A disadvantage of the known dolly's is however that the braking action leaves to be desired. The risk exists that the dolly skids, for example when a sideways force is exerted on the dolly. Due to the relatively small contact surface excessive wear of the tread of the concerned wheel occurs due to the surface pressure on the tread being relatively high. Yet another disadvantage is that the braking action is relatively hard to dose: when the braking member engages on the tread and subsequently is moved away from the tread, the transition from 'braked' to 'unbraked' will be pretty abrupt because at just a minimal operation of the operating member the braking member will no longer be in contact with the tread.

An aim of the invention is thus to provide a dolly that provides an improved braking action.

A further aim of the invention is to provide a dolly, wherein wear of the tread is reduced.

Yet a further aim of the invention is to improve the dosing of the braking action of the known dolly's.

Hereto the dolly according to the invention is characterized in that the braking member comprises a flexible body, that is positioned near the tread of the concerned wheel and that is fixedly connected with a first body part to the bottom part or the suspension system and with a second body part is connected to an end of the activation member, wherein upon movement of the operating member to the braking position, the second body part is bent towards the tread of the concerned wheel by the activation member for engagement of the flexible body on the tread.

By applying the above measures it is achieved that the braking action of the dolly is improved, due to the flexible body as comprised by the braking member in a way can be bent over the tread, as a result of which if desired a significantly larger contact surface can be obtained. Besides, the larger contact surface has as a consequence that wear of the tread decreases. Furthermore, the braking action can be better dosed, because upon engagement of the flexible body on the tread or the moving away of the flexible body from the tread, the size of the contact surface gradually increases respectively decreases.

An embodiment concerns an aforementioned dolly, wherein the flexible body is plate-shaped, wherein a main surface of the plate shape is arranged for bending towards the tread. Such a plate-shaped body has a relatively large braking surface/contact surface, is relatively light and can be bent towards the tread of the wheel relatively easily with its main surface.

An embodiment concerns an aforementioned dolly, wherein the flexible body is constructed as a leaf spring element. To cause the flexibly body to engage on the tread of the wheel in a relatively firmer though more resilient way, the use of a leaf spring is advantageous. Besides, such a leaf spring element offers the advantage that the degree of engagement is relatively easily adjustable by changing the geometry of the leaf spring element.

An embodiment concerns an aforementioned dolly, wherein an end of the flexible body is provided with an edge turned towards the tread near the second body part, wherein the edge is arranged for engagement on the tread. This edge can be shaped in such a way, that it engages on the tread relatively firmly to (initially) provide a relatively powerful braking force, for example before the other parts of the flexible braking body engage on the tread of the wheel.

An embodiment concerns an aforementioned dolly, wherein the flexible body is made of leaf spring steel. Such leaf spring steel is relatively strong and well-capable of withstanding all sorts of loads.

An embodiment concerns an aforementioned dolly, wherein the tread of the wheel is made of a relatively tougher material than the rest of the wheel. Such a construction of the wheel provides for less wear of the tread and furthermore provides for it to be better capable of withstanding deformation at low temperatures, especially at −20° C. or lower, or 50° C. or higher.

An embodiment concerns an aforementioned dolly, wherein the operating member comprises a foot pedal that is hingeably connected to the bottom part in an attachment point and is hingeable around a during use horizontal first hinge axis, wherein the foot pedal has a lower operating surface and an upper operating surface, wherein the lower operating surface is suitable for receiving the lower side of the foot of a user for moving the foot pedal downwards for achieving the braked condition and the upper operating surface is suitable for receiving the instep or tip of the foot of the user for operating the foot pedal for achieving the unbraked condition. Thus relatively simple operation of the braking system can be achieved, wherein just a single foot pedal is needed to effect that operation, which reduces mechanical complexity and thus increases reliability.

An embodiment concerns an aforementioned dolly, wherein, at a distance of the first hinge axis, the foot pedal is hingeably connected in a second hinge axis running substantially parallel to the first hinge axis to an activation rod running substantially horizontal and parallel to the underside of the bottom part, wherein the activation rod extends substantially perpendicularly to the first and second hinge axes, wherein the activation rod is connected to a hinge element in a third hinge axis with one or more ends, which hinge axis runs substantially parallel to the first and second hinge axes, wherein, at a distance from the third hinge axis, the hinge element is fixedly connected to an activation shaft, rotatably arranged in the bottom part and the rotational axis of which is substantially aligned with the first, second and third hinge axes, wherein the rotational shaft is moveably connected to the activation member, wherein by operation of the foot pedal to the braking position rotation of the rotational shaft is achieved and the second body part is bent towards the tread of the concerned wheel by the activation member for engagement of the flexible body on the tread. Such a rod construction effects a reliable and operationally safe transfer of forces from the foot pedal to the braking member.

An embodiment concerns an aforementioned dolly, wherein in the rotational shaft a recess is arranged in radial direction, wherein an upper end of the activation member can be received, wherein, when the foot pedal is in the braking position, the rotational shaft is in a first rotational orientation, wherein an upper end of the activation member is received in the recess and when the foot pedal is in the release position, the rotational shaft is in the second rotational orientation, wherein the upper end of the activation member is pressed out of the recess and moved towards the tread of the wheel. Of course, instead of a recess a cam and the like can be used.

An embodiment concerns an aforementioned dolly, wherein the recess has a radial depth of approximately ½ times the diameter of the concerned rotational shaft at the position of the recess. In practice, this appears to effect good operability and sufficient 'stroke' of the activation member.

Figure 2:
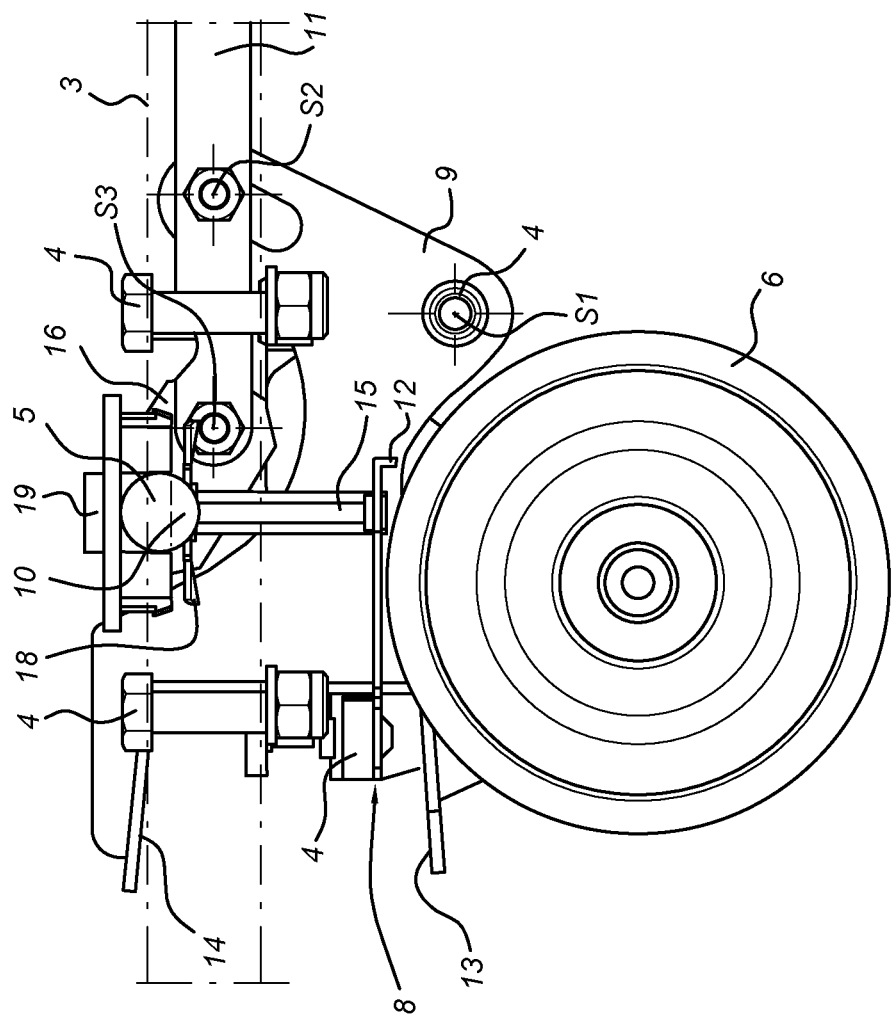

The invention will be elucidated with reference to an exemplary embodiment by means of the figures, wherein:

FIG. 1 shows a perspective view of a dolly undercarriage according to the present invention; and FIG. 2 shows a side view in detail of one of the wheels.

FIG. 1, which will be discussed hereafter, shows an undercarriage 2 for a dolly according to the invention, provided with four wheels 6, 7 to be able to position the dolly and to move it. These wheels 6, 7 can comprise non-swivel wheels as well as swivel casters 6. On the undercarriage 2 a superstructure can be arranged during use, wherein the goods can be stored, for transport of these goods, for example in a truck, or for presentation of these goods, for example in a supermarket. These goods can for instance comprise foodstuffs, cleaning agents, household items, electronics and such. Alternatively, a so-called 'display' can be arranged on the undercarriage. According to the invention, such a dolly is provided with a braking system to prevent undesirable movement thereof.

FIG. 1 shows the undercarriage 2 of the dolly according to the invention in perspective view. The undercarriage 2 is provided with a bottom part (not shown) upon which, on the upper side, the superstructure can be arranged. The bottom part can for example comprise a flat plate. The undercarriage is fixably connected to the bottom part (indicated by reference numeral 3 in FIG. 2) in multiple attachment points 4. For improving identification of the dolly the bottom part 3 is preferably provided with a bar code. The dimensions of the dolly and especially of the bottom part 3 may vary and, in top view, can amount to, by means of example, 40×60 cm, 60×80 cm, 60×100 cm or otherwise. On the left side of the undercarriage 2 an operating member embodied by a hingeable foot pedal 9 is arranged to move flexible braking members 8 (the functioning of which will be elucidated with reference to FIG. 2) arranged above the wheels 6, 7 from a let-down, braked condition to a lifted, unbraked condition and vice versa. Preferably, the foot pedal 9 has such dimensions that this foot pedal does not protrude outside of the bottom part 3 in the to-be-used positions thereof (when seen in top view), such that as little space as possible is needed to position multiple dolly's behind each other in a row.

FIGS. 1 and 2—for as far as visible—show the lifted, unbraked condition of the braking members 8. In the braked condition the braking members 8 contact the treads of the wheels 6, 7 such that rotation of the wheels 6, 7 and movement of the undercarriage 2 is prevented. Preferably, the diameter of the wheels 6, 7, the height of the bottom part 3 and related dimensions are so chosen that the space between the underside of the bottom part 3 and the underground (the so-called 'ground clearance') minimally amounts to 8 cm, to avoid getting stuck because of irregularities in the road surface (drains, cobble stones and the like). The bottom part 3 preferably is made of HDPE, such that recycling of the bottom part 3 is possible.

The foot pedal 9, as shown on the left side of FIG. 1, is hingeably connected to the bottom part in an attachment point 4, such that a first, substantially parallel hinge axis S1 is formed around which the foot pedal 9 can rotate with respect to the bottom part. At a distance of that hinge axis S1 the foot pedal 9 is hingeably connected to an activation rod 11 running substantially horizontally and parallel to the underside of the bottom part via a groove in the foot pedal 9 in a hinge axis S2. This hinge axis S2 also runs parallel to the hinge axis S2.

At the left end thereof the activation rod 11 is hingeably connected to a hinge element 16 in a hinge axis S3, that runs substantially parallel to the hinge axes S1 and S2. In turn the hinge element 16 is connected fixedly to a rotatable shaft 5 at a distance of the hinge axis S3, the rotatable axis of which is substantially aligned with the hinge axes S1, S2 and S3.

Similarly, at the right end thereof, the activation rod 11 is hingeably connected to a hinge axis, that runs substantially parallel to the hinge axes S1 and S2. In turn, the hinge element 16 is also connected fixedly to a rotatable shaft 5 at a distance of the hinge axis S3, the rotatable axis of which is substantially aligned with the hinge axes S1, S2, and S3.

Near both ends of both elongated rotational shafts 5, at the underside thereof, recesses 10 are arranged. These recesses 10 preferably have a radial depth of about ½ times the diameter of the concerned rotational shaft 5. In each of these recesses 10 an upper end of a vertically extending activation bar 15 is received. With the depth of the recess 10 the stroke of the activation bar 15 can be adjusted. At the lower end of each of the activation bars 15 the concerned braking member 8 is arranged. The functioning of this braking member 8 will be elucidated also with reference to FIG. 2.

FIG. 2 shows a side view of the dolly undercarriage according to the invention. In FIG. 2 it can be seen that the rotational shafts 5 are rotatably enclosed in an enclosing element embodied by an enclosing ring 19, arranged an the upper side op the rotational shafts 5 and a supporting element, such as a supporting ring 18, at the underside of the rotational shafts 5. Otherwise it is conceivable that the enclosing ring 19 merely concerns a covering plate to facilitate maintenance, such as lubrication.

At the lower end of the activation bar 15 a flexible braking member is arranged embodied by a flexible braking plate 8. On the one hand the braking plate 8 is connected to the lower end of the activation bar 15, on the other hand the braking plate 8 is fixedly connected to the bottom part 3 in an attachment point 4 or to the suspension system of the wheel 6, such that, when the wheel 6 concerns a swivel caster, the braking plate 8 can rotate along with the swivel caster. If desired, an extra spring element can be arranged halfway the braking plate 8, that engages on the tread of the wheel 6 in the braked condition to create additional grip. As shown in FIG. 2, at the right end of the braking plate 8 an edge 12 is arranged, that also creates additional grip and braking force when engaging on the tread 7. Preferably, this edge 12 concerns a bent edge, i.e. that this edge in a geometrical sense makes a gradual transition to the rest of the braking plate 8.

As mentioned before, FIG. 1 shows the unbraked condition. When the user of the dolly wants to achieve the braked condition, he kicks the foot pedal 9 downwards, wherein the foot pedal 9 will hinge around the hinge axis S1. In FIG. 1, the activation rod 11 therein is pulled to the left and is moved downwards. As a consequence thereof, the hinge element 16 is rotated clockwise. Because of their fixed connection to the rotational shafts 5, also these rotational shafts 5 are rotated clockwise. The upper ends of the activation bars 15 therein are moved downwards and due to rotation are pushed out of the recesses 10. If desired, the abovementioned rods of the rod system can be made of a synthetic.

Referring to FIG. 2, the flexible braking plate 8 is bent downwards and with increasing pressure on the foot pedal 9 the braking plate 8 engages on the tread of the wheel, such that the wheel can no longer roll. In order to subsequently return to the unbraked condition again, the foot pedal 9 is moved upwards, after which the preceding actions take place in reversed order.

As can be seen in FIG. 2, the foot pedal 9 comprises two operating surfaces 13, 14, wherein the lower operating surface 13 is intended for receiving the lower side of the user's foot to move the foot pedal 9 downwards for achieving the braked condition and the upper operating surface 14 is suitable for receiving the instep or tip of the foot of the user for operating the foot pedal 9 for achieving the unbraked condition. If desired, a foot pedal 9 constructed in this way can also be applied to dolly's having differing braking systems (i.e. braking systems that are operated without the flexible body according to the invention). Preferably, each individual wheel 6, 7 is provided with a braking construction with a flexible braking member 8 and by operating the foot pedal 9 each of those braking members 8 is operated.

When the wheel to be blocked or braked concerns a swivel caster (such as one of the swivel casters 6 of FIG. 1), the suspension system of this swivel caster is arranged in such a way with respect to the bottom part that the suspension system is rotatable around a substantially vertical axis of rotation, i.e. with respect to the aforementioned bottom part. Preferably, the activation bar 15 is aligned with the axis of rotation of the suspension system, such that, even when the braking member 8 engages on the wheel, if desired, rotation of the swivel caster around that vertical axis of rotation is more or less possible, although rolling of this swivel caster is prevented.

In a general sense, rotation of the concerned wheel can be achieved for example by providing the rotatable (part of the) suspension system of the swivel caster with a ring shape at the upper side thereof, wherein the geometrical center of the ring shape is located at the position of the activation bar 15 and the plane wherein the ring is positioned extends perpendicularly to the longitudinal direction of the activation bar 15. Likewise, the part of the suspension system that is fixedly attached to the bottom part 3, can be provided with a corresponding ring shape that fittingly engages the ring shape of the rotatable part of the suspension system, though allows rotation of the rotatable part of the suspension system.

When the foot pedal 9 is moved towards the braking position, fully free rotation of the swivel caster around a vertical axis of rotation can be prevented, because, during the letting down of the activation bar 15, a blocking body connected thereto (not shown) engages on the rotatable part of the suspension system (such as the upper side thereof), for example the ring shape. Otherwise, a blocking body is conceivable that presses the ring shapes of the rotatable part of the suspension system as well as the part thereof that is fixedly connected to the bottom part 3 together in such a way that free rotation of the rotatable part of the suspension system of the swivel caster is prevented.

Otherwise, the ring shapes or the blocking body (when this also has the shape of a ring or similar shape) can be provided along the circumference thereof with corresponding serration patterns or wave patterns, such that, when the ring shapes are pressed together by the blocking body or otherwise (or the blocking body is pressed onto one of the ring shapes) a good grip is obtained. Otherwise, during an emergency, these serration patterns do allow that rotation of the rotatable part of the suspension system with respect to the fixed part is possible, though with difficulty. Only when a relatively large sideways force is exerted on the swivel caster (a force that can cause the swivel caster to rotate around the vertical axis), for example when a forklift hits the swivel caster with one of its forks, the serrations of the serration patterns can move over each other. A characteristic rattle sound will then be heard. It is thus prevented in an advantageous way that the braking system gets damaged. At total blockage of the rotatable part of the suspension system with respect to the fixed part thereof or the bottom part 3 it may indeed occur otherwise that the swivel caster or the rotatable part of the suspension system breaks off from the fixed part of the suspension system or the bottom part 3, which is of course very undesirable.

It should be clear that the above description is intended for illustrating the functioning of an exemplary embodiment of the invention, and not to limit the scope of the invention. Departing from the above elucidation, many variations will be evident to the man skilled in the art lying within the scope of the invention.

LIST OF REFERENCE NUMERALS

1. —
2. Undercarriage
3. Bottom part
4. Attachment to bottom part
5. Activation shaft
6. Swivel caster
7. Non-swivel wheel
8. Braking plate
9. Hingeable foot pedal
10. Recess in activation shaft
11. Activation rod
12. Edge
13. Lower operating surface
14. Upper operating surface
15. Activation bar
16. Hinge element (near swivel casters)
18. Supporting element for activation shaft
19. Enclosing ring for activation shaft

The invention claimed is:

1. Dolly for transporting or presenting goods, comprising:
an undercarriage (2) with a bottom part (3) extending substantially horizontally during use that during use at an upper side thereof can be provided with a superstructure for comprising the goods to be transported or presented, one or more wheels (6, 7) arranged at an underside of the undercarriage (2), wherein the wheels (6, 7) each comprise a tread and are rollably suspended in a suspension system that is attached to the lower side of the bottom part (3), an operating member (9) arranged on the undercarriage (2), wherein the dolly can be brought from an unbraked condition, for moving the dolly, to a braked condition, for parking the dolly, by operating the operating member (9), a braking member (8), arranged below the bottom part (3) near at least one of the wheels (6, 7), which braking member (8) is mechanically coupled to the operating member (9), wherein the braked condition can be achieved by moving the braking member (8) by means of an activation member (15) attached thereto in the direction of the tread of the concerned wheel (6, 7), by moving the operating member (9) to a braking position, and the unbraked position can be achieved by moving the braking member (8) away from the concerned wheel (6, 7) by means of the activation member (15), by moving the operating member (9) to a release position, wherein the braking member (8) comprises a flexible body, that is positioned near the tread of the concerned wheel (6, 7) and that is fixedly connected with a first body part to the bottom part (3) or the suspension system and with a second body part is connected to an end of the activation member (15), wherein upon movement of the operating member (9) to the braking position, the second body part is bent towards the tread of the concerned wheel (6, 7) by the activation member (15) for engagement of the flexible body on the tread, wherein the wheels (6, 7) comprise a swivel caster (6) having a suspension system with a part fixedly connected to the bottom part (3) and a part rotatable around a vertical axis of rotation, wherein the activation member (15) is aligned with the vertical axis of rotation, wherein, when the operating member (9) is moved to the braking position, a blocking body connected to the activation member (15) comprising a ring shape or a ring shape of the fixed part engages a corresponding ring shape of the rotatable part of the suspension system of the swivel caster, wherein the ring shape of the fixed part of the suspension system, the ring shape of the rotatable part of the suspension system or the ring shape of the blocking body are provided with serration patterns or wave patterns, such that free rotation of the rotatable part is prevented.

2. Dolly according to claim 1, wherein the flexible body is plate-shaped, wherein a main surface of the plate shape is arranged for bending towards the tread.

3. Dolly according to claim 1, wherein the flexible body is constructed as a leaf spring element.

4. Dolly according to claim 1, wherein an end of the flexible body is provided with an edge (12) turned towards the tread near the second body part, wherein the edge is arranged for engagement on the tread.

5. Dolly according to claim 1, wherein the flexible body is made of leaf spring steel.

6. Dolly according to claim 1, wherein the tread of the wheel is made of a relatively tougher material than the rest of the wheel.

7. Dolly according to claim 1, wherein the operating member comprises a foot pedal (9) that is hingeably connected to the bottom part (3) in an attachment point (4) and is hingeable around a during use horizontal first hinge axis (S1), wherein the foot pedal (9) has a lower operating surface (13) and an upper operating surface (14), wherein the lower operating surface (13) is suitable for receiving the lower side of the foot of a user for moving the foot pedal (9) downwards for achieving the braked condition and the upper operating surface (14) is suitable for receiving the instep or tip of the foot of the user for operating the foot pedal (9) for achieving the unbraked condition.

8. Dolly according to claim 7, wherein, at a distance of the first hinge axis (S1), the foot pedal (9) is hingeably connected in a second hinge axis (S2) running substantially parallel to the first hinge axis (S1) to an activation rod (11) running substantially horizontal and parallel to the underside of the bottom part (3), wherein the activation rod (11) extends substantially perpendicularly to the first and second hinge axes (S1, S2), wherein the activation rod (11) is connected to a hinge element (16) in a third hinge axis (S3) with one or more ends, which hinge axis runs substantially parallel to the first (S1) and second hinge axes (S2), wherein, at a distance from the third hinge axis (S3), the hinge element is fixedly connected to an activation shaft (5), rotatably arranged in the bottom part (3) and the rotational axis of which is substantially aligned with the first, second and third hinge axes (S1, S2, S3), wherein the rotational shaft (5) is moveably connected to the activation member (15), wherein by operation of the foot pedal (9) to the braking position rotation of the rotational shaft (5) is achieved and the second body part is bent towards the tread of the concerned wheel (6, 7) by the activation member (15) for engagement of the flexible body on the tread.

9. Dolly according to claim 8, wherein in the rotational shaft (5) a recess (10) is arranged in radial direction, wherein an upper end of the activation member (15) can be received, wherein, when the foot pedal (9) is in the braking position, the rotational shaft (5) is in a first rotational orientation, wherein an upper end of the activation member (15) is received in the recess (10) and when the foot pedal (9) is in then release position, the rotational shaft (5) is in the second rotational orientation, wherein the upper end of the activation member (15) is pressed out of the recess (10) and moved towards the tread of the wheel.

10. Dolly according to claim 9, wherein the recess (10) has a radial depth of approximately ½ times the diameter of the concerned rotational shaft (5) at the position of the recess (10).

11. Dolly according to claim 2, wherein the flexible body is constructed as a leaf spring element.

12. Dolly according to claim 2, wherein an end of the flexible body is provided with an edge (12) turned towards the tread near the second body part, wherein the edge is arranged for engagement on the tread.

13. Dolly according to claim 3, wherein an end of the flexible body is provided with an edge (12) turned towards the tread near the second body part, wherein the edge is arranged for engagement on the tread.

14. Dolly according to claim 2, wherein the flexible body is made of leaf spring steel.

15. Dolly according to claim 3, wherein the flexible body is made of leaf spring steel.

16. Dolly according to claim 4, wherein the flexible body is made of leaf spring steel.

17. Dolly according to claim 2, wherein the tread of the wheel is made of a relatively tougher material than the rest of the wheel.

18. Dolly according to claim 3, wherein the tread of the wheel is made of a relatively tougher material than the rest of the wheel.

19. Dolly according to claim 4, wherein the tread of the wheel is made of a relatively tougher material than the rest of the wheel.

20. Dolly according to claim 5, wherein the tread of the wheel is made of a relatively tougher material than the rest of the wheel.

* * * * *